United States Patent [19]

Cheng

[11] Patent Number: 5,667,220
[45] Date of Patent: Sep. 16, 1997

[54] CONTROLLER FOR A VIDEO GAME CONSOLE

[75] Inventor: Chou Cheng, Miao-Li Hsien, Taiwan

[73] Assignee: Top Game & Company Ltd., Miao-Li Hsien, Taiwan

[21] Appl. No.: 556,508

[22] Filed: Nov. 13, 1995

[30] Foreign Application Priority Data

Nov. 15, 1994 [CN] China ................................ 94243459.5

[51] Int. Cl.⁶ .................................................... A63B 7/00
[52] U.S. Cl. ...................... 273/148 B; 463/36; 463/37; 463/46; 345/156; 345/158
[58] Field of Search ................... 273/148 B; 463/36, 463/37, 38, 39, 46, 47; 345/156, 158, 161

[56] References Cited

U.S. PATENT DOCUMENTS

| | | | |
|---|---|---|---|
| 4,588,187 | 5/1986 | Dell | 463/36 X |
| 4,816,810 | 3/1989 | Moore | 273/148 B X |
| 4,924,216 | 5/1990 | Leung | 273/148 B X |
| 5,421,590 | 6/1995 | Robbins | 463/37 |
| 5,551,701 | 9/1996 | Bouton et al. | 273/148 B X |

*Primary Examiner*—Raleigh W. Chiu
*Attorney, Agent, or Firm*—Finnegan, Henderson, Farabow, Garrett & Dunner

[57] ABSTRACT

A controller for a video game console includes first and second handheld control units. Each of the handheld control units has a housing with a finger operating surface that is provided with a control button, and a transmitting unit for transmitting signals to the video game console when the control button unit is operated. An interconnecting unit is provided for releasably interconnecting the housings of the control units.

14 Claims, 9 Drawing Sheets

CONTROLLER FOR A VIDEO GAME CONSOLE

BACKGROUND OF THE INVENTION

1. Field of the Invention

This invention relates to a controller for a video game console, more particularly to a controller which has separable handheld control units.

2. Description of the Related Art

Figure 1:
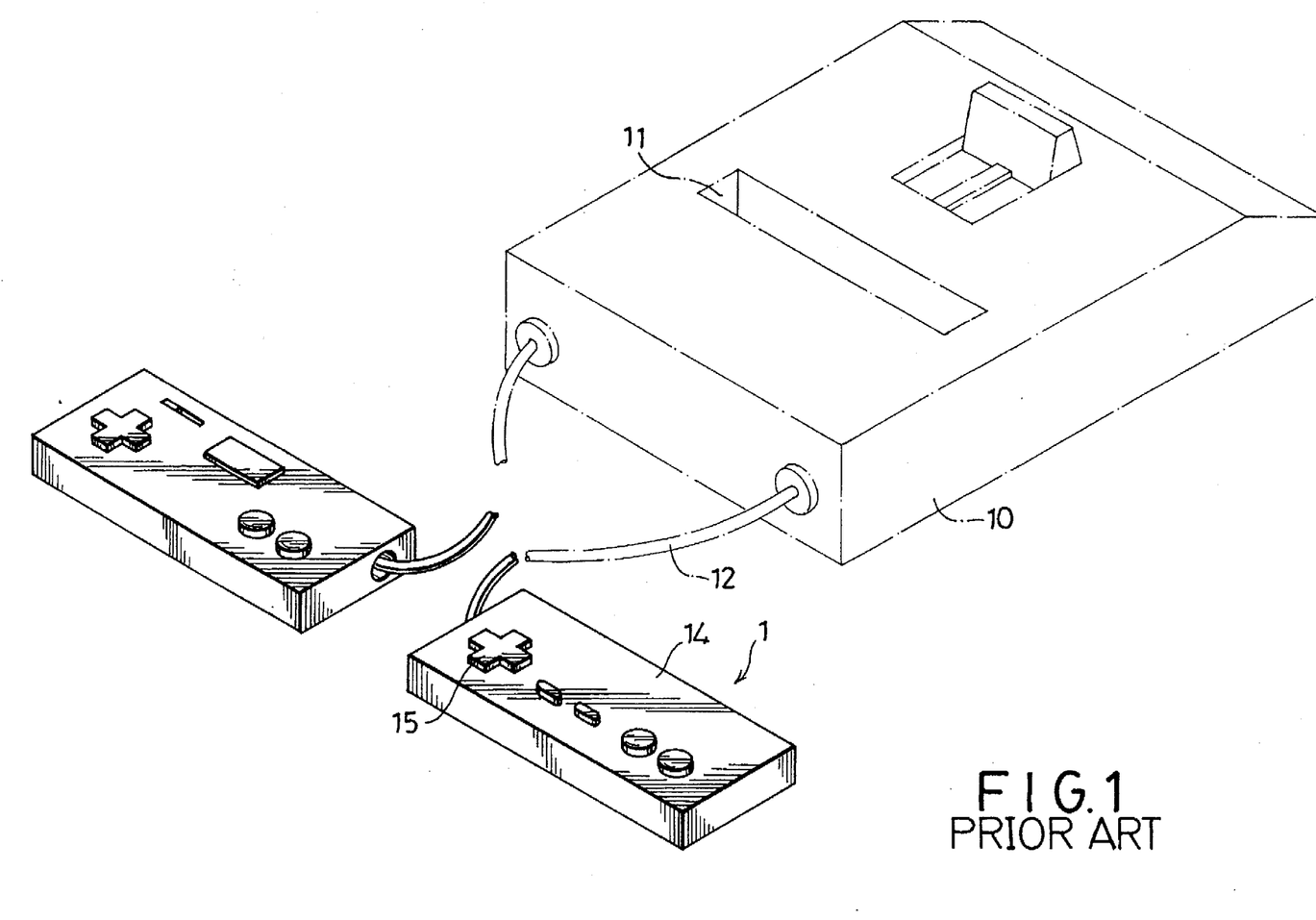
FIG. 1 is a schematic perspective view showing conventional controllers for a video game console.

FIG. 1 shows a conventional video game console which utilizes two conventional controllers. The conventional video game console includes a casing 10 formed with a receiving slot 11 for receiving a game cartridge (not shown), and a processing unit (not shown) which is disposed in the casing 10 and which is adapted to process data in the game cartridge when the latter is received in the slot 11. Each of the conventional controllers has a handheld control unit 1 which comprises a housing 14 with a finger operating surface provided with a plurality of control buttons 15, and cable means 12, connected electrically to the processing unit, for transmitting signals to the processing unit when the control buttons 15 are operated.

Use of the aforementioned conventional controller with a video game console results in the following drawbacks:

1. Since all of the control buttons 15 are provided on the finger operating surface of the housing 14, and since the size of the housing 14 is relatively small, it is inconvenient for the user to operate the control buttons 15 simultaneously with his two hands. This situation is aggravated when the user has relatively big hands.
2. Since all of the control buttons 15 are provided on the finger operating surface of the housing 14, the entire conventional controller has to be replaced even though only one of the control buttons 15 is damaged after a period of use.
3. Since all of the control buttons 15 are provided on the finger operating surface of the housing 14, it is inconvenient for a more experienced user to assist a less experienced user in operating some of the control buttons 15 on the housing 14.

SUMMARY OF THE INVENTION

Therefore, the objective of the present invention is to provide a controller for a video game console, which controller can overcome the drawbacks that are commonly associated with the aforementioned prior art.

According to the present invention, a controller for a video game console includes first and second handheld control units. Each of the first and second handheld control units has a housing with a finger operating surface that is provided with a control button unit, and means for transmitting signals to the video game console when the control button unit is operated. An interconnecting means is provided for releasably interconnecting the housings of the handheld control units.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 2:
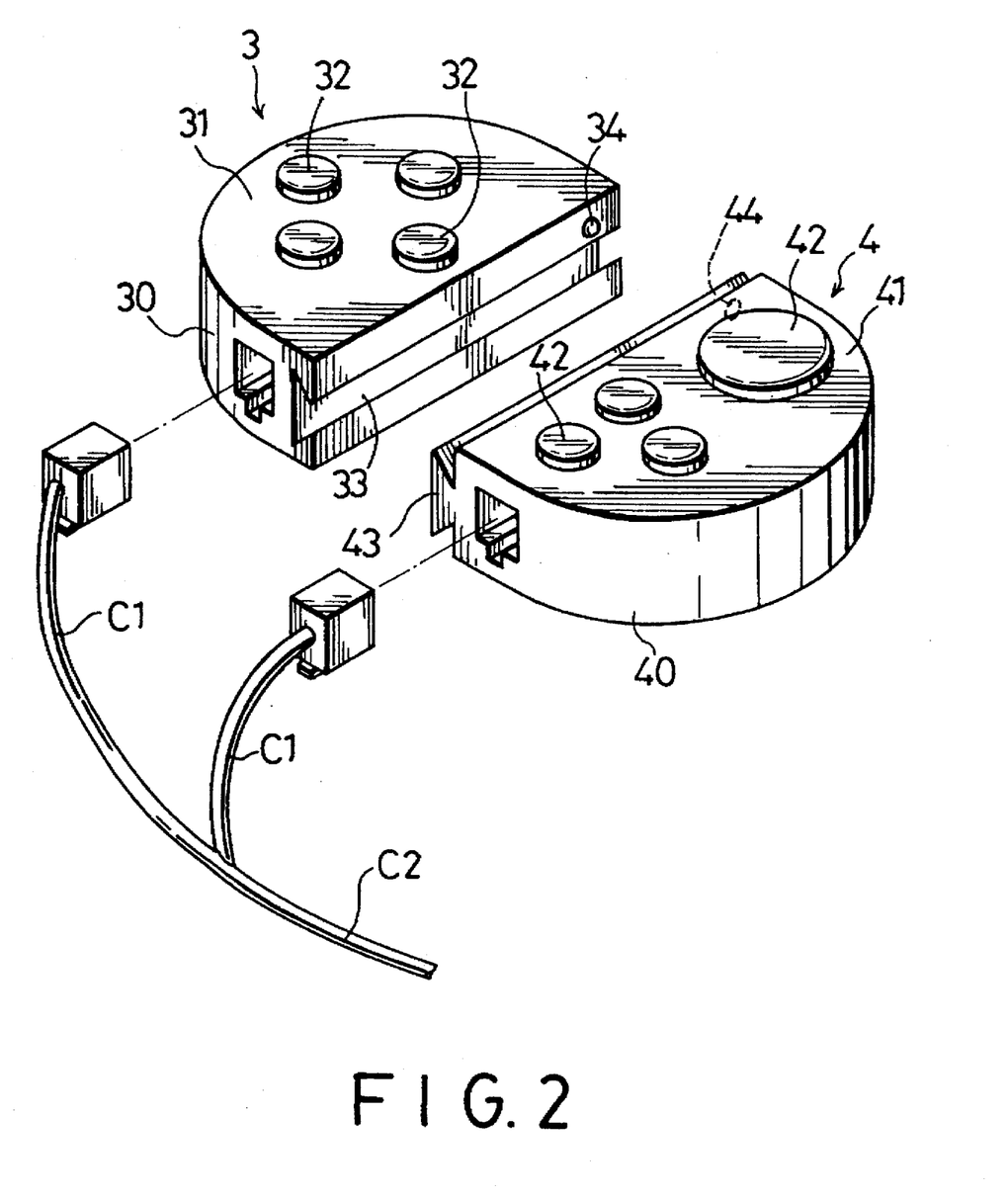
FIG. 2 is a schematic perspective view showing a controller for a video game console in accordance with a first preferred embodiment of the present invention.

Referring to FIG. 2, the first preferred embodiment of a controller for a video game console (not shown) in accordance with the present invention includes first and second handheld control units, 3 and 4. Each of the control units, 3 and 4, has a housing 30,40 with a finger operating surface 31,41 which is provided with a control button unit. Each of the control button unit includes at least one control button 32,42. In the present embodiment, the control button unit of each of the control units 3,4 is shown to be provided with four control buttons 32,42.

Figure 3:
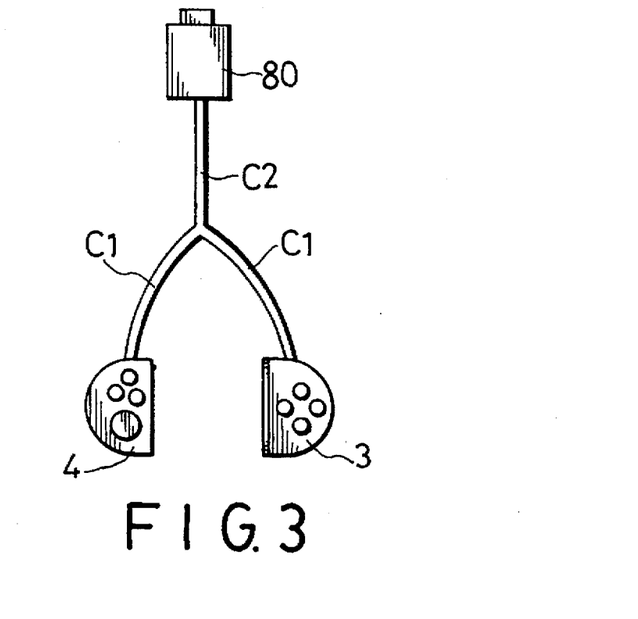
FIG. 3 is a schematic view illustrating the electrical connection between a video game console and the first preferred embodiment shown in FIG. 2.

Referring now to FIGS. 2 and 3, the controller of the present embodiment further includes a connector 80 which is adapted to be connected electrically to a processing unit (not shown) of the video game console. Each of the control units 3,4 further has a transmitting means (shown in phantom lines) which includes a cable (C1) having one end portion connected electrically to the control button unit thereof and an opposite end portion connected electrically to the connector 80 via a cable (C2) and which transmits signals to the processing unit of the video game console when the control buttons 32,42 are operated.

The housing 30,40 of each control unit 3,4 further has an engaging surface which is transverse to the finger operating surface 31,41. The engaging surface of the housing 30 of the first handheld control unit 3 is formed with an engaging groove 33 and a convex positioning protrusion 34. In the present embodiment, the engaging groove 33 is an elongated dovetail groove which extends in a direction parallel to the finger operating surface 31. The engaging surface 41 of the housing 40 of the second handheld control unit 4 has an engaging projection 43 extending therefrom. In the present embodiment, the engaging projection 43 is an elongated dovetail projection. The engaging surface 41 is formed with a positioning recess 44 adjacent to an end portion of the engaging projection 43. The engaging groove 33 and the engaging projection 43 cooperatively serve as an interconnecting means for releasably interconnecting the housings 30,40 of the handheld control units 3,4, while the positioning protrusion 34 and the positioning recess 44 cooperatively serve as a positioning means for preventing relative movement between the housings 30,40 when the engaging projection 43 engages the engaging groove 33.

It should be appreciated that the engaging groove 33 can be formed in the engaging surface of the housing 40, while the engaging projection 43 can be provided on the engaging surface of the housing 30. Furthermore, the position of the positioning protrusion 34 and the positioning recess 44 are also interchangeable.

In operation, the housing 30 can be connected releasably to the housing 40 by engaging fittingly the engaging projection 43 in the engaging groove 33 until the positioning protrusion 34 is received in the positioning recess 44. Alternatively, the housing 30 can be separated from the housing 40 by removing the engaging projection 43 from the engaging groove 33 in accordance with the user's needs.

Figure 4:
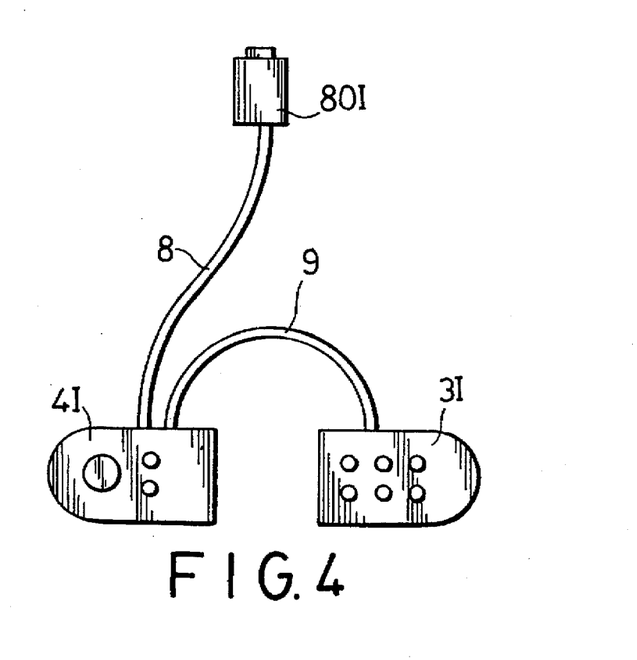
FIG. 4 is a schematic view illustrating the electrical connection between a video game console and a controller in accordance with a second preferred embodiment of the present invention.

Referring to FIG. 4, a second preferred embodiment of the present invention is shown. In this embodiment, the transmitting means of the first control unit (3I) includes a first cable 9 having one end portion connected electrically to the control button unit thereof and an opposite end portion connected electrically to the control button unit of the second control unit (4I). The transmitting means of the second control unit (4I) includes a second cable 8 having one end portion connected electrically to the control button unit thereof and an opposite end portion connected electrically to the connector (80I).

Figure 5:
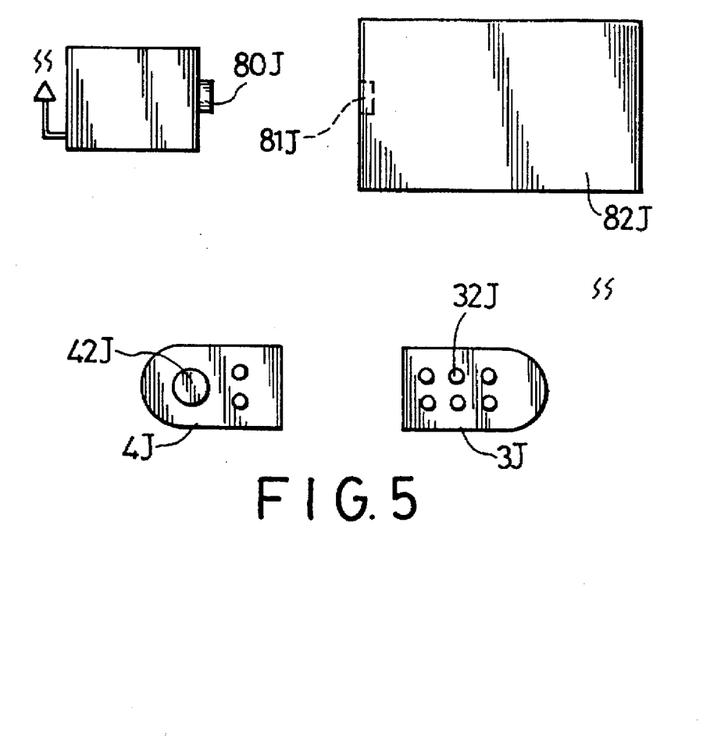
FIG. 5 is a schematic view illustrating the electrical connection between a video game console and a controller in accordance with a third preferred embodiment of the present invention.

With reference to FIG. 5, a third preferred embodiment of the present invention is shown. In this embodiment, the transmitting means of each of the control units (3J,4J) includes a wireless radio signal transmitter (T) which is connected electrically to the respective control button unit and which transmits wireless radio signals when the control buttons (32J,42J) are operated. The controller further includes a wireless radio signal receiver (R) which receives the wireless radio signals from the wireless radio signal transmitter (T) and which is connected electrically to a connector (80J) that is adapted to be connected electrically to the processing unit of the video game console (82J) via a receptacle (81J).

Figure 6:
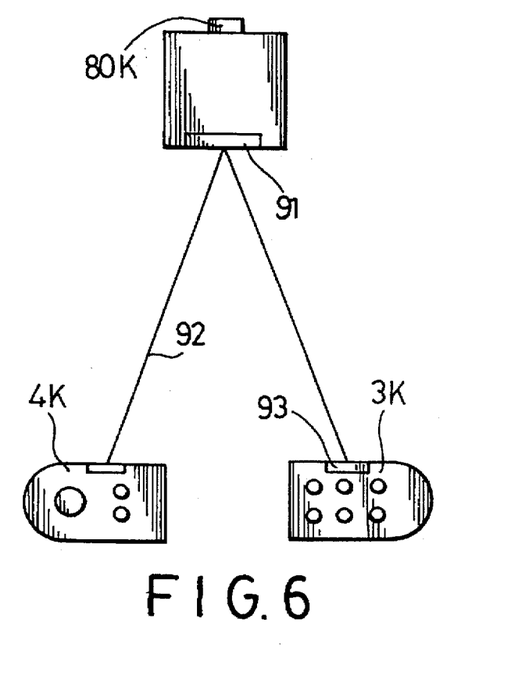
FIG. 6 is a schematic view illustrating the electrical connection between a video game console and a controller in accordance with a fourth preferred embodiment of the present invention.

Referring to FIG. 6, a fourth preferred embodiment of the present invention is shown. In the present embodiment, the transmitting means of each of the control units (3K,4K) includes an infrared signal transmitter 93 which is connected electrically to the respective control button unit and which transmits infrared signals 92 when the control buttons (32K, 42K) are operated. The controller further includes an infrared signal receiver 91 which receives the infrared signals 92 from the infrared signal transmitter 93 and which is connected electrically to a connector (80K) that is adapted to be connected electrically to the processing unit of the video game console.

Figure 7:
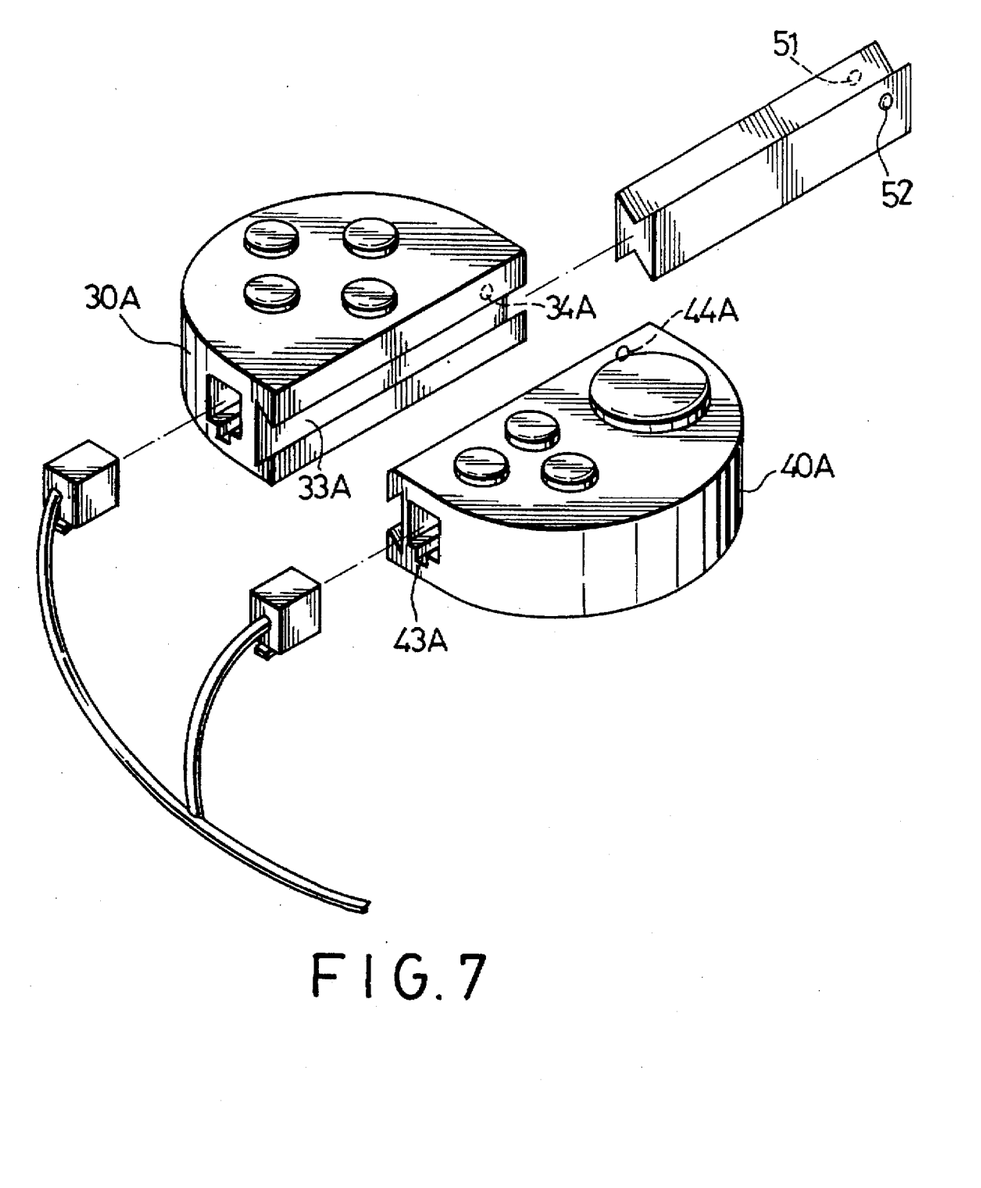
FIG. 7 is a schematic perspective view showing a controller for a video game console in accordance with a fifth preferred embodiment of the present invention.

Referring now to FIG. 7, a fifth preferred embodiment of the present invention is shown. In the present embodiment, the interconnecting means includes an elongated dovetail groove (33A,43A) which is formed in the engaging surface of each of the housings (30A,40A) and which is identical to that of the preferred embodiment shown in FIG. 2, and an elongated joining member 50 having opposite dovetail projections which engage releasably the dovetail grooves (33A, 43A) of the housings (30A,40A) to connect separably the housings (30A,40A). In the present embodiment, the positioning means includes a positioning protrusion (34A) which projects from a groove wall of the engaging groove (33A) opposite to the housing (40A), a positioning recess 51 which is formed in the projection surface of one of the projections of the joining member 50 opposite to the groove wall of the engaging groove (33A) and which receives the positioning protrusion (34A) therein, a positioning protrusion 52 which projects from a projection surface of the other one of the projections of the joining member 50 toward the housing (40A), and a positioning recess (44A) which is formed in a groove wall of the engaging groove (43A) and which receives the positioning protrusion 52 therein.

Figure 8:
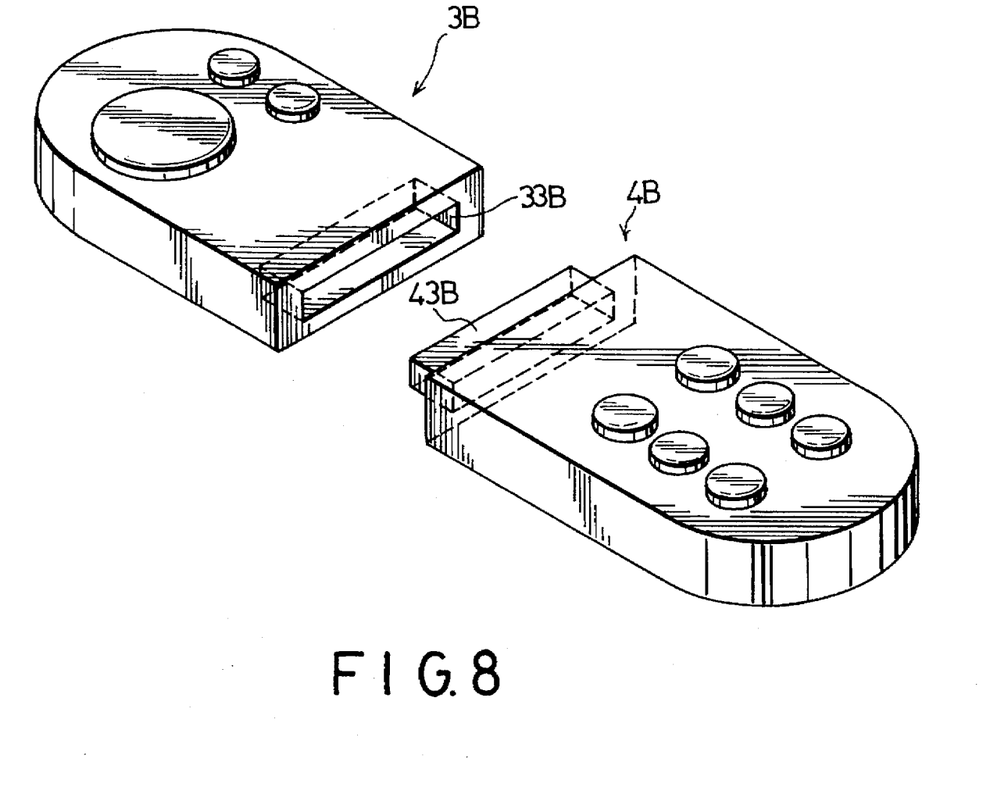
FIG. 8 is a schematic perspective view showing a controller for a video game console in accordance with a sixth preferred embodiment of the present invention.

Referring now to FIG. 8, a sixth preferred embodiment of the present invention is shown. In this embodiment, the positions of the engaging groove (33B) and the engaging projection (43B) are similar to those of the engaging groove 33 and the engaging projection 43 of the first preferred embodiment shown in FIG. 2. However, the engaging groove (33B) of the first handheld control unit (3B) is a rectangular groove, while the engaging projection (43B) of the second handheld control unit (4B) is a rectangular projection that is to be inserted removably in the engaging groove (33B).

Figure 9:
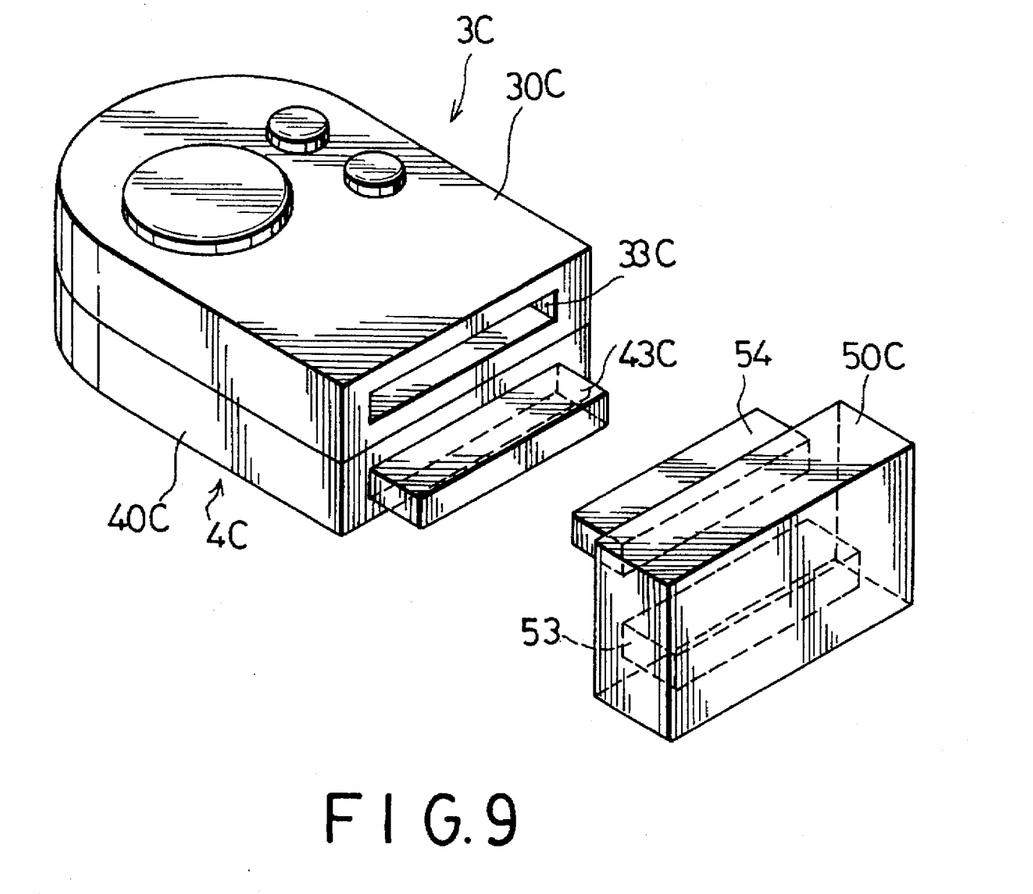
FIG. 9 is a schematic perspective view showing a controller for a video game console in accordance with a seventh preferred embodiment of the present invention.

Referring now to FIG. 9, a seventh preferred embodiment of the present invention is shown. In this embodiment, the engaging groove (33C) and the engaging projection (43C) are identical to those of the sixth preferred embodiment shown in FIG. 8. However, the interconnecting means further includes a joining member (50C) formed with a locking groove 53 that engages removably the engaging projection (43C) therein, and a locking projection 54 that engages removably the engaging groove (33C) so as to connect the housings (30C,40C) to one another such that the finger operating surfaces of the housings (30C,40C) are opposite to one another, thereby permitting simultaneous operation of the control units (3C,4C) with one hand.

Figure 10:
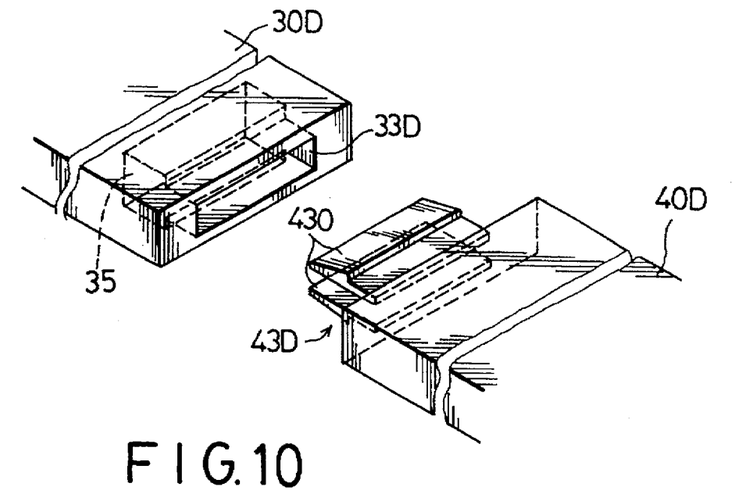
FIG. 10 is a schematic perspective view showing a controller for a video game console in accordance with an eighth preferred embodiment of the present invention.

Referring now to FIG. 10, an eighth preferred embodiment of the present invention is shown. In this embodiment, the engaging groove (33D) is similar to that of the sixth preferred embodiment shown in FIG. 8. However, the finger operating surface of the housing (30D) is further formed with a through-hole 35 which extends to the engaging groove (33D). The engaging projection (43D) includes a parallel pair of resilient hook plates 430. Each of the hook plates 430 has a hooked end portion which extends through the engaging groove (33D) and into the through-hole 35 so as to connect releasably the housings (30D,40D) to one another. To disconnect the housings (30D,40D) from each other, the operator can press the spring plates 430 toward each other by extending his fingers into the through-hole 35.

Figure 11:
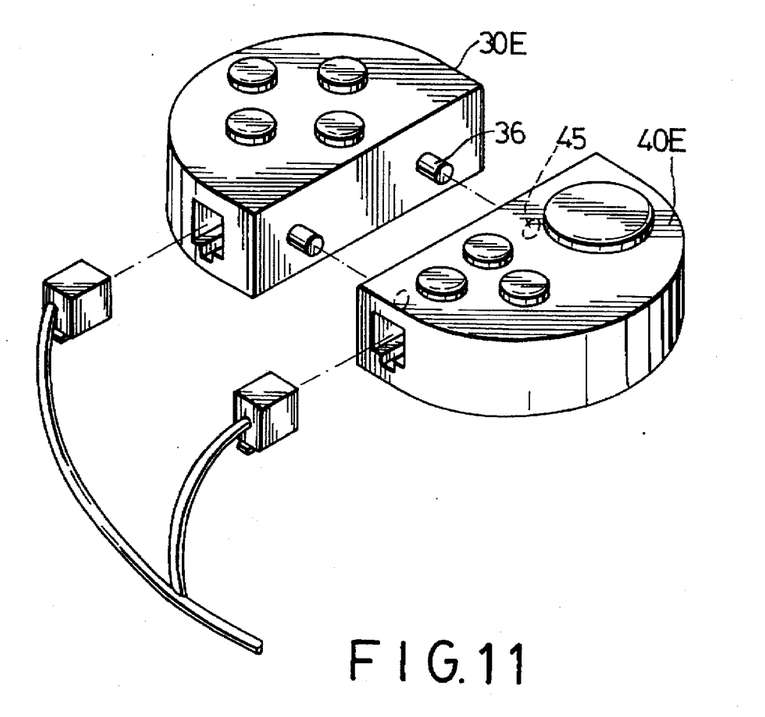
FIG. 11 is a schematic perspective view showing a controller for a video game console in accordance with a ninth preferred embodiment of the present invention.

Referring now to FIG. 11, a ninth preferred embodiment of the present invention is shown. In this embodiment, the interconnecting means includes two engaging projections 36 which extend from the engaging surface of the housing (30E), and two engaging grooves 45 which are formed in the engaging surface of the housing (40E). Each of the engaging grooves 45 is in the form of an insert hole for receiving fittingly and removably the respective engaging projections 36, which are in the form of an insert pin, so as to interconnect releasably the housings (30E,40E).

Figure 12:
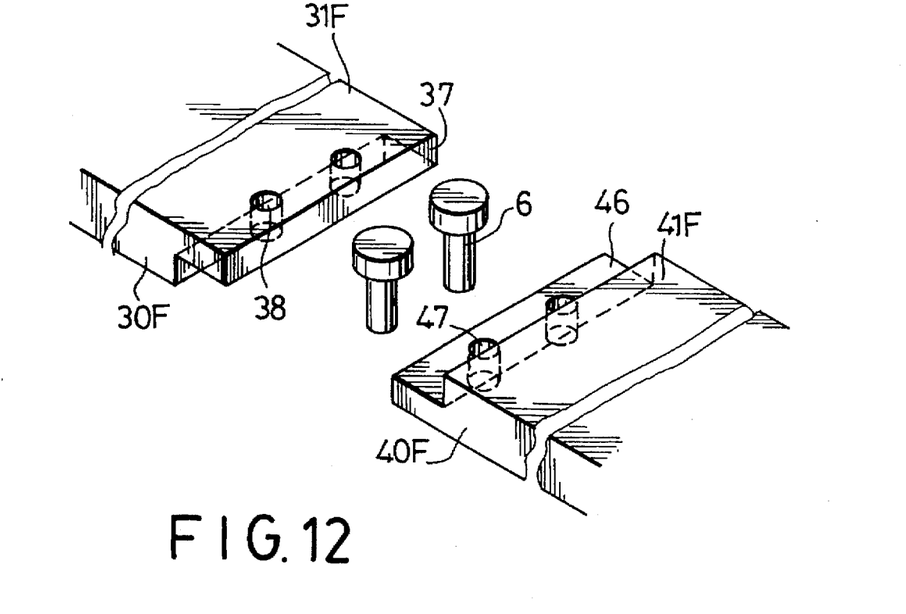
FIG. 12 is a schematic perspective view showing a controller for a video game console in accordance with a tenth preferred embodiment of the present invention.

Referring to FIG. 12, a tenth preferred embodiment of the present invention is shown. In the present embodiment, the interconnecting means including overlapping upper and lower tab members, 37 and 46, which extend respectively from the engaging surface of the housings (30F,40F). Each of the tab members 37,46 is formed with a pair of spaced vertically extending engaging holes 38,47. The interconnecting means further includes a pair of insert pins 6 that extend removably, through the aligned engaging holes 38,47 in the tab members 37,46 of the housings (30F,40F) so as to connect separably the housings (30F,40F) to one another.

Figure 13:
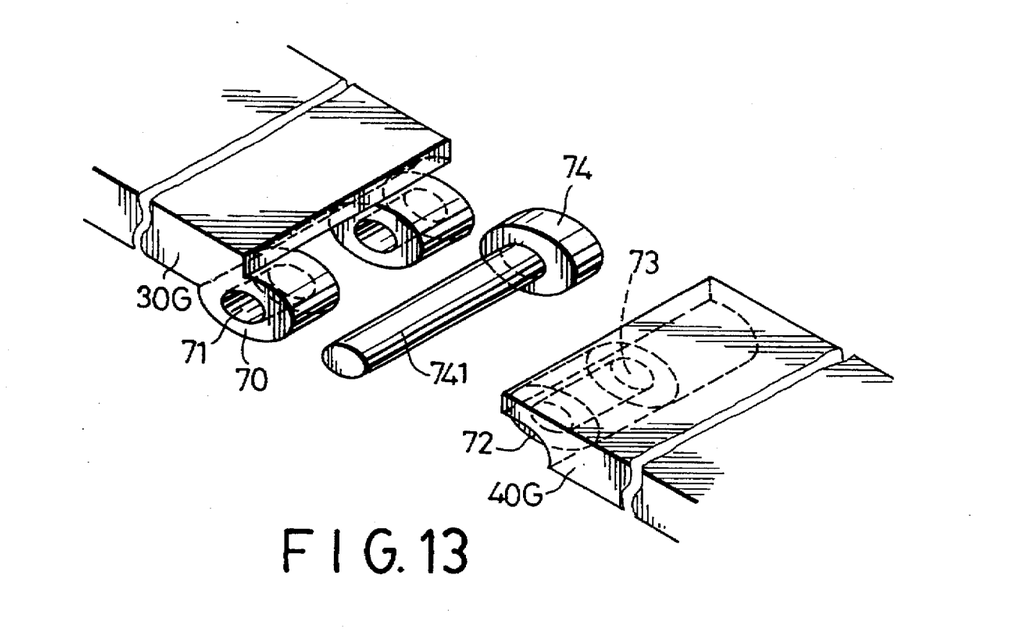
FIG. 13 is a schematic perspective view showing a controller for a video game console in accordance with an eleventh preferred embodiment of the present invention.

Referring now to FIG. 13, an eleventh preferred embodiment of the present invention is shown. In this embodiment, the interconnecting means includes lug members 70,72 which extend from the engaging surface of each of the housings (30G,40G) and which are formed with horizontally extending aligned oval-shaped through-holes 71,73, and an insert shaft 74 which has an oval-shaped shaft portion 741 and which is extendible removably through the through-holes 71,73 of the lug members 70,72 when the latter are aligned so as to interconnect releasably the housings (30G, 40G). It should be noted that when the housings (30G,40G) of the present embodiment are connected as such, the finger operating surfaces of the housings (30G,40G) are opposite to one another in order to permit simultaneous operation of the control units with one hand.

Accordingly, the controller of the present invention has the following advantages:

1. The housings of the control units of the controller are separable in accordance with the user's needs, thereby enhancing flexibility of the controller when in use.
2. Only the control unit which has a damaged control button needs to be repaired, thereby minimizing the repair cost.
3. The controller of the present invention can be used with a conventional video game console by merely connecting the connector of the controller to a predetermined port of the conventional video game console.
4. Since the housings of the control units of the controller are separable, it is convenient for a more experienced user to assist a less experienced user in operating some of the control buttons.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A controller for a video game console, comprising first and second handheld control units, each of which has a housing with a finger operating surface and an engaging surface which is transverse to said finger operating surface, said finger operating surface being provided with a control button unit, means for transmitting signals to the video game console when said control button unit of each of said control units is operated and means for releasably interconnecting said housings of said handheld control units, said interconnecting means including at least one engaging projection extending from said engaging surface of onr of said housings, and at least one engaging groove which is formed in said engaging surface of the other one of said housings for releasably engaging said engaging projection.

2. The controller of claim 1, wherein said engaging projection is a dovetail projection and said engaging groove is a dovetail groove.

3. The controller of claim 2, further comprising positioning means for preventing relative movement between said housings when said engaging projection engages said engaging groove.

4. The controller of claim 3, wherein said positioning means includes a convex positioning protrusion extending from said engaging surface of one of said housings, and a concave positioning recess which is formed in said engaging surface of the other one of said housings so as to releasably receive said positioning protrusion therein when said engaging projection engages completely said engaging groove.

5. The controller of claim 1, wherein said interconnecting means further includes a joining member formed with a locking groove that removably engages said engaging projection of said one of said housings, and a locking projection that removably engages said engaging groove of said other one of said housings so as to interconnect separably said housings such that said finger operating surfaces of said housings are opposite to one another.

6. The controller of claim 1, wherein said finger operating surface of said one of said housings is further formed with a through-hole which extends to said engaging groove, said engaging projection of said other one of said housings including a parallel pair of resilient hook plates, each of said hook plates having a hooked end portion which extends through said engaging groove and into said through-hole so as to releasably interconnect said housings.

7. The controller of claim 1, further comprising a connector which is adapted to be connected electrically to the video game console, said transmitting means of each of said control units including a cable which has one end portion connected electrically to said control button unit thereof and an opposite end portion connected electrically to said connector.

8. The controller of claim 1, further comprising a connector which is adapted to be connected electrically to the video game console, said transmitting means of said first control unit including a first cable which has one end portion connected electrically to said control button unit thereof and an opposite end portion connected electrically to said control button unit of said second control unit, said transmitting means of said second control unit including a second cable which has one end portion connected electrically to said control button unit thereof and an opposite end portion connected electrically to said connector.

9. The controller of claim 1, wherein said transmitting means of each of said control units includes a wireless radio signal transmitter which is connected electrically to said respective control button unit and which transmits wireless radio signals when the respective control button unit is operated, said controller further including a wireless radio signal receiver which receives said wireless signals from said wireless signal transmitters and which is adapted to be connected electrically to the video game console.

10. The controller of claim 1, wherein said transmitting means of each of said control units includes an infrared signal transmitter which is connected electrically to said respective control button unit and which transmits infrared signals when the respective control button unit is operated, said controller further including an infrared signal receiver which receives said infrared signals from said infrared signal transmitters and which is adapted to be connected electrically to the video game console.

11. A controller for video game console, comprising first and second handheld control units, each of which has a housing with a finger operating surface and an engaging surface which is transverse to said finger operating surface, said finger operating surface being provided with a control button unit, means for transmitting signals to the video game console when said control button unit of each of said control units is operated and means for releasably interconnecting said housings of said handheld control units, said interconnecting means including an elongated dovetail groove formed in said engaging surface of each of said housings, and an elongated joining member which has opposite dovetail projections that releasably engage said dovetail groove of said housings to interconnect separably said housings.

12. A controller for a video game console, comprising first and second handheld control units, each of which has a housing with a finger operating surface and an engaging surface which is transverse to said finger operating surface, said finger operating surface being provided with a control button unit, means for transmitting signals to the video game console when said control button unit of each of said control units is operated and means for releasably interconnecting said housings of said handheld control units, said interconnecting means including overlapping upper and lower tab members which extend respectively from said engaging surface of said housings, each of said tab members being formed with a spaced pair vertically extending engaging holes, said interconnecting means further including a pair of insert pins which extend removably through said engaging holes of said tab members so as to interconnect separably said housings.

13. A controller for a video game console, comprising first and second handheld control units, each of which has a housing with a finger operating surface and an engaging surface which is transverse to said finger operating surface, said finger operating surface being provided with a control button unit, means for transmitting signals to the video game console when said control button unit of each of said control units is operated and means for releasably interconnecting said housings of said handheld control units, said interconnecting means including a pair of lug members, each of which extends from said engaging surface of a respective one of said housings and is formed with a horizontally extending through-hole, and an insert shaft which has a shaft portion that extends removably through said through-holes of said lug members so as to interconnect releasably said housings.

14. The controller of claim 13, wherein each of said through-holes is an oval-shaped through-hole for receiving fittingly and removably said shaft portion of said insert shaft.

* * * * *